INVENTOR.
George G. Riland.

July 2, 1957 G. G. RILAND 2,797,773
NON-SKID CIRCULAR CHAIN TRACK

Filed April 5, 1955 2 Sheets-Sheet 2

*INVENTOR.*
George G. Riland.
BY *Victor J. Evans & Co.*
ATTORNEYS

United States Patent Office 2,797,773
Patented July 2, 1957

2,797,773
NON-SKID CIRCULAR CHAIN TRACK
George G. Riland, Mifflinburg, Pa.

Application April 5, 1955, Serial No. 499,298

2 Claims. (Cl. 188—4)

This invention relates to non-skid devices for motor vehicles, and in particular, a spider having arms of pivotally connected sections with chains extended between the arms and means for adjustably mounting the spider on the rear axle housing of a motor vehicle whereby the arms and chains are adapted to be, selectively, extended below tires of wheels carried by the axle or retracted to nested position below the axle housing and spaced above the ground.

The purpose of this invention is to provide a non-skid device that is adapted to be adjusted to a position for use from the seat of the operator of the vehicle whereby the device may be used as desired and readily retracted to a nested position when use thereof is not desired.

Various types of non-skid tire chains have been provided and although numerous devices have been developed for applying non-skid chains to wheels it is difficult, if not impossible, to apply such chains to tires of wheels without soiling the hands and clothing of a mechanic, attendant of a filling station, or operator of the vehicle particularly where such chains are applied at moderate temperatures, as in slush or mud. With this thought in mind, this invention contemplates a method of supporting non-skid chains below side sections of a rear axle housing whereby the chains are adapted to be moved to operative positions below the tires of wheels of a vehicle when the use of chains is required and wherein the chains are adapted to be withdrawn and elevated to nested positions below the sections of the axle housing when use of the chains is no longer required.

The object of this invention is, therefore, to provide means for mounting non-skid elements on motor vehicles whereby the elements are adapted to be extended to positions for use and also retracted to nested positions below the chassis of the vehicle from the seat of the operator of the vehicle.

Another object of the invention is to provide means for constructing and mounting non-skid devices on motor vehicles whereby the devices are adapted to be extended for use and retracted to nested position when use thereof is not desired from the seat of the vehicle in which means is provided for terminating rotation of the devices as they are retracted to the nested positions.

A further object of the invention is to provide improved non-skid devices for motor vehicles in which the devices are adapted to be extended for use and retracted to nested position after use from the seat of the operator of the vehicle in which the devices are of simple and economical construction.

With these and other objects and advantages in view, the invention embodies a plurality of radially disposed arms formed with pivotally connected links extended from a hub with chains extended between the arms and with the hub suspended by pivotally mounted bars carried by clamps adapted to be positioned on sections of a rear axle housing and actuated by cables extended to a hand lever adapted to be positioned on the instrument panel of a motor vehicle upon which the devices are mounted.

Other features and advantages of the invention will appear from the following description, taken in connection with the drawings, wherein.

Figure 1:
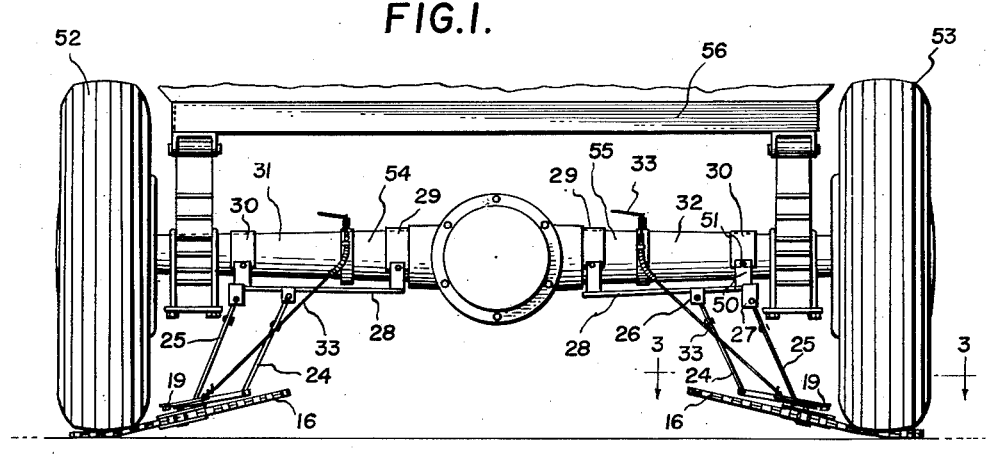
Figure 1 is a rear elevational view showing the lower portion of a motor vehicle with the non-skid devices, which are mounted on side sections of the rear axle housing of the vehicle, extended to positions for use wherein peripheral portions thereof are positioned below tires of the vehicle.

Referring now to the drawings, wherein like reference characters denote corresponding parts, the improved non-skid device of this invention includes a hub 10 having a lower flange 11 and an upper flange 12, stationary links 13 extended from the hub, pivotally connected links 14, pivotally mounted by pins 15 in extended ends of the links 13, a chain 16 extended around ends of the arms, intermediate chains 17 and 18 extended between intermediate parts of the arms, a brake 19 positioned to engage the upper flange 12 pivotally mounted by arms 20 and 21 on a lug 22 extended upwardly from the hub 10, a lever 23 extended from the arms 20 and 21 and pivotally connected to rods 24 and 25 the upper ends of which are pivotally connected by bearings 26 and 27, respectively, to a bracket 28 that is secured by clamps 29 and 30 to sections 31 and 32 of a rear axle housing, and a cable 33 extended from the arm 21 over idler pulleys 34 positioned at suitable points on the chassis of a vehicle upon which the rear axle housing is mounted to a hand lever 35 adapted to be pivotally mounted by a pin 36 on the instrument panel of a vehicle as indicated by broken lines 37. A similar lever and cable assembly is provided for a similar device at the opposite side of the vehicle and suspended from the rear axle housing section 31.

Figure 2:
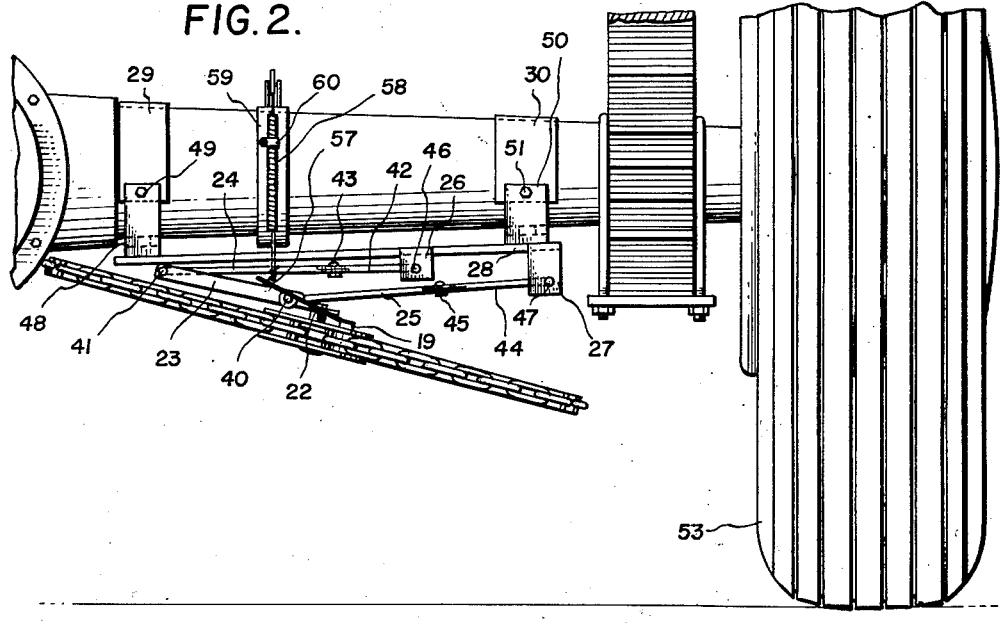
Figure 2 is a rear elevational view, similar to that shown in Figure 1, with the parts shown on an enlarged scale showing a non-skid device at one side of the vehicle retracted to a nested position below the section of the rear axle housing of the vehicle, other parts of the device being broken away.
Figure 3:
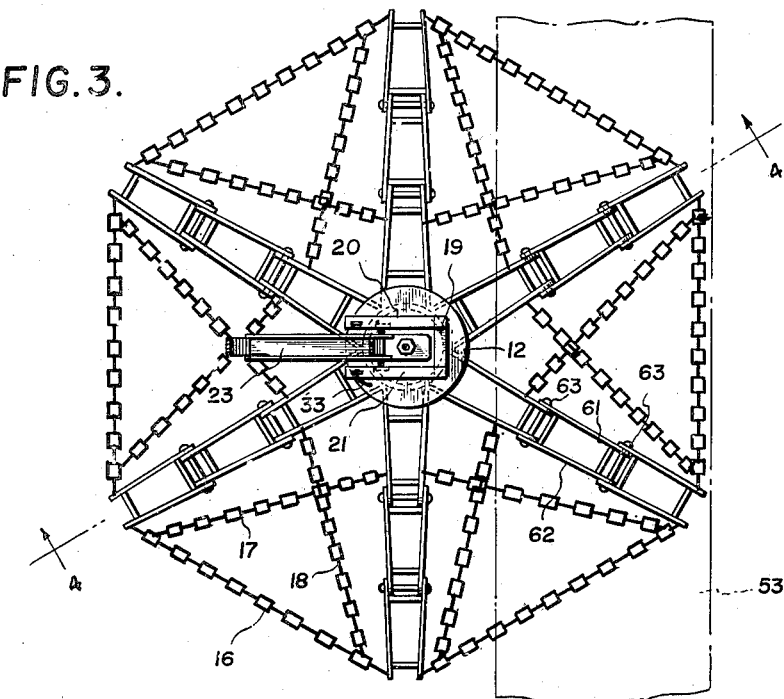
Figure 3 is a plan view of the non-skid device taken on line 3—3 of Figure 1 with the parts shown on an enlarged scale and illustrating the device with the parts in extended positions.

The lever 23 is secured to a center portion 38 of the hub 10 with a bolt 39, and, as shown in Figure 2, the inner end of the lever is pivotally connected to the lower end of the outer rod 25 with a pin 40. The outer end of the lever 23 is pivotally connected by a pin 41 to the lower end of the rod 24. The rods 24 and 25 are provided with hinged connections, the lower portion of the rod 24 being pivotally connected to an upper portion 42 with a pin 43 and the lower portion of the rod 25 being similarly connected to an upper portion 44 with a pin 45. The upper portion 42 of the rod 24 is pivotally connected to the bearing 26 with a pin 46 and the section 44 of the rod 25 is pivotally connected to the bearing 27 with a pin 47.

The inner end of the bracket 28 is provided with a semi-circular element 48 that is secured to the upper section of the clamp 29 with bolts 49. The opposite end of the bracket 28 is provided with a similar substantially semi-circular element 50 that is secured to the clamp 30 with bolts, such as the bolts 51. With the brackets mounted in this manner, they may readily be adjusted whereby the radially disposed arms and chains swing to positions below tires, such as the tires 52 and 53, at the ends of sections 54 and 55 of a rear axle housing of a vehicle, as indicated by the numeral 56.

Figure 5:
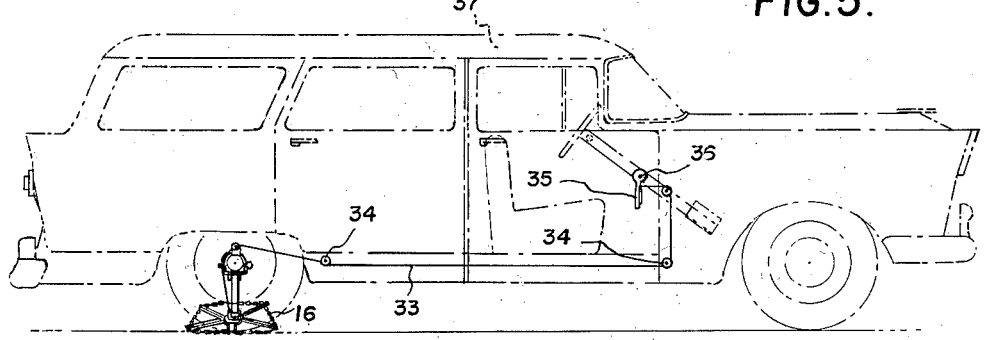
Figure 5 is a side elevational view of a vehicle, the vehicle being shown in broken lines, illustrating the relative positions of the non-skid devices and hand lever for operating the devices through a cable.

The cable 33, which is attached to an eye 57 on one of the arms 20 or 21, extends through a flexible shield 58 that is secured on a shoe 59 with a clamp 60 and from the shield the cable extends to the idler pulleys 34, as illustrated in Figure 5.

Figure 4:
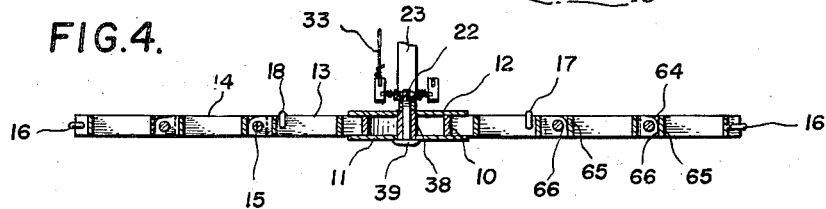
Figure 4 is a cross section through the device taken on line 4—4 of Figure 3 illustrating the hinged units forming the arms of the device.

Although the drawing illustrates the arms of the spider as being formed with two pivotally mounted links, such as the links 14, it will be understod that the arms may be formed with any suitable number of links and, as illustrated in Figure 4, the links are formed with side bars 61 and 62 with inner ends of the bars overlapping outer ends of the bars of adjoining links and the bars are pivotally connected to the outer ends of the links with pins 63. The outer ends of the links, such as the links 61 and 62, are provided with arcuate upper surfaces 64 that are adapted to engage inner surfaces of crossbars 65 whereby corners 66 at the lower sides of the links contacts inner surfaces of the crossbars preventing the outer links dropping downwardly and permitting the outer links to fold upon inner links. It will be understood that the links may be formed in other suitable shapes or designs.

With the parts designed and assembled in this manner, a pull upwardly on the hand lever 35 draws the traction elements upwardly from the positions shown in Figure 1 to the position illustrated in Figure 2 whereby the device is spaced above the ground and nested below the rear axle housing; and when use of the device is desired the hand lever 35 is actuated to relieve tension in the cable 33 with the weight of the device carrying it downwardly to a position below the tire, as illustrated in Figure 1.

With the devices in the positions, as illustrated in Figure 1, traction is provided for the wheels and with the devices rotated by the wheels a continuous tread will be provided.

The spider arms and chains may be provided in different patterns or designs and any suitable number of links may be used in the arms so that arms may be provided for different types of tires or for other devices.

It will be understood that other modifications, within the scope of the appended claims, may be made in the design and arrangement of the parts without departing from the spirit of the invention.

What is claimed is:

1. A non-skid device for motor vehicles comprising a spider having a hub provided with upper and lower flanges and with radially disposed arms having the inner ends thereof positioned between the flanges and with chains extended between said arms, a bracket adapted to be clamped on a rear axle housing of a vehicle, rods pivotally connected to the bracket at one of the ends thereof and to the spider with the opposite ends thereof, said rods being positioned to, selectively, support the spider in an extended position with the arms and chains thereof below a wheel on an axle extended from said rear axle housing, or to an elevated position nested below said rear axle housing, a lug extended upwardly from the hub, a pair of arms mounted on said lug, a cable connected at one end to and extended from the hub of the spider and adapted to be connected at the opposite end to a hand lever at the instrument panel of a vehicle of which said rear axle housing forms a part, and a brake pivotally mounted on said pair of arms and positioned to engage the upper flange of the hub and actuated by the cable for preventing rotation of the spider.

2. In a non-skid device for motor vehicles, the combination which comprises a spider having a hub provided with upper and lower flanges and with radially disposed arms having the inner ends thereof positioned between the flanges, said arms being formed with pivotally connected links, chains extended between the arms of the spider, a lever mounted on the spider, a bracket adapted to be clamped to the section of a rear axle housing at one side of a motor vehicle, rods pivotally connected, at one of the ends thereof, to said bracket and at the other of the ends thereof to said lever, said rods and brackets being positioned to, selectively, retain the spider in an elevated position nested below the section of the rear axle housing or to an extended position with part of the spider extended below a tire of a wheel on an axle extended through said rear axle housing, a lug extended upwardly from the hub, a pair of arms mounted on said lug, a cable connected at one end to and extended from the hub of said spider to be connected at the opposite end to a hand lever on an instrument panel of a vehicle of which said rear axle housing forms a part, and a brake pivotally mounted on said pair of arms and also actuated by said cable, for preventing rotation of said spider.

References Cited in the file of this patent
UNITED STATES PATENTS

| | | |
|---|---|---|
| 1,118,233 | Rinyik | Nov. 24, 1914 |
| 1,600,299 | Rystedt | Sept. 21, 1926 |
| 1,731,499 | Myers | Oct. 15, 1929 |
| 2,140,606 | Stickles | Dec. 20, 1938 |
| 2,277,036 | Chaussee | Mar. 24, 1942 |

FOREIGN PATENTS

| | | |
|---|---|---|
| 267,230 | Great Britain | Mar. 14, 1927 |